Figure 1:
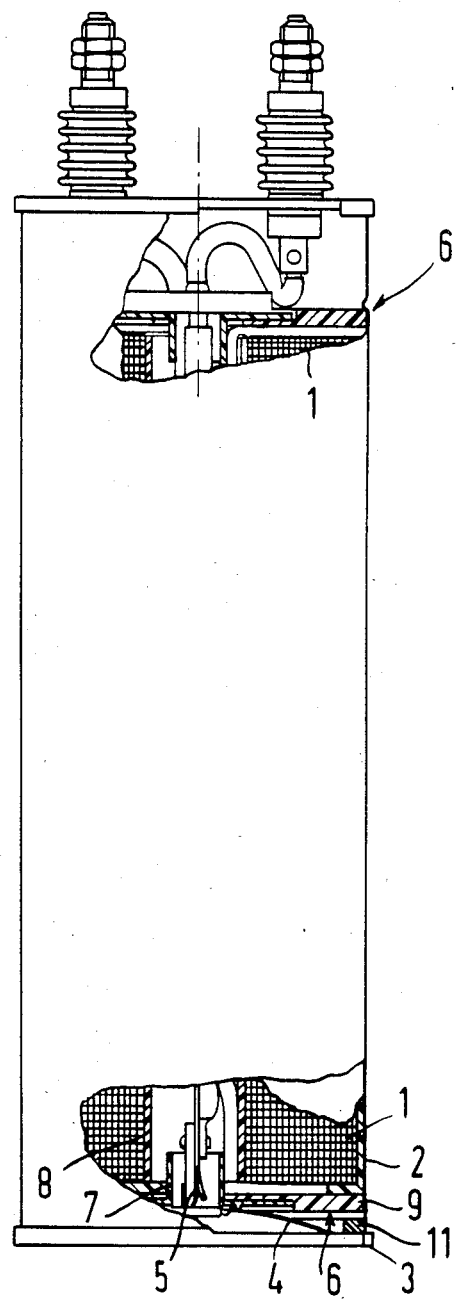

United States Patent [19]

Erhardt et al.

[11] Patent Number: 4,577,257
[45] Date of Patent: Mar. 18, 1986

[54] ELECTRIC CAPACITOR WITH AN EXCESSIVE-PRESSURE SAFETY PROTECTION MECHANISM

[75] Inventors: Werner Erhardt, Ballendorf; Udo Hieber, Heidenheim, both of Fed. Rep. of Germany

[73] Assignee: Siemens Aktiengesellschaft, Berlin and Munich, Fed. Rep. of Germany

[21] Appl. No.: 628,808

[22] Filed: Jul. 9, 1984

[30] Foreign Application Priority Data

Jul. 13, 1983 [DE] Fed. Rep. of Germany ....... 3325343

[51] Int. Cl.$^4$ .......................... H01G 1/06; H01G 9/00
[52] U.S. Cl. ..................................... 361/272; 361/433
[58] Field of Search .................. 361/272, 275, 433 W, 361/433 L

[56] References Cited

U.S. PATENT DOCUMENTS 3,221,225 11/1965 Sternbeck .................... 361/275 X
4,296,453 10/1981 Aigle et al. .................... 361/275

Primary Examiner—Donald A. Griffin
Attorney, Agent, or Firm—Herbert L. Lerner; Laurence A. Greenberg

[57] ABSTRACT

An electric capacitor includes a housing having an inwardly-arched, substantially spherical, dome-shaped bottom membrane, a capacitor winding disposed in the housing, an excessive-pressure protection safety device disposed in the housing in vicinity of the bottom membrane, a central core tube disposed in the winding, and an insulating disc disposed between the winding and the bottom membrane, the disc having at least two parts and including an extension protruding into the central core tube.

3 Claims, 3 Drawing Figures

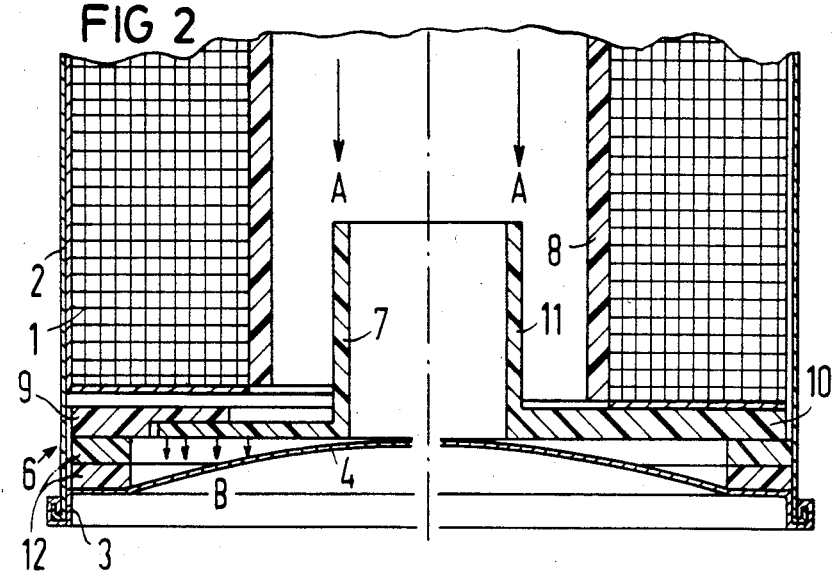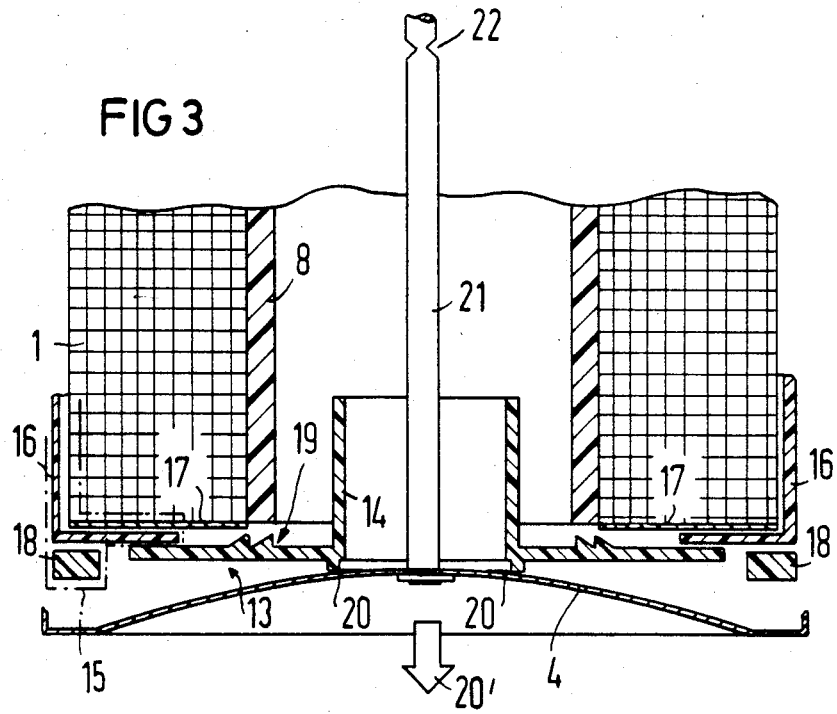

ELECTRIC CAPACITOR WITH AN EXCESSIVE-PRESSURE SAFETY PROTECTION MECHANISM

The invention relates to an electric capacitor, especially a power capacitor with an excessive-pressure safety protection mechanism, the mechanism being installed in a housing having a bottom which is constructed as a functional or working membrane with a spherical dome-shaped inwardly-arched bottom, and an insulating disc disposed between the capacitor winding and the housing bottom, the insulating disc having an extension piece extending into a central core tube inside the capacitor winding.

A capacitor of this type has been disclosed in German Published, Non-Prosecuted Application No. DE-OS 28 25 453. By constructing the bottom of the housing as a functional membrane in such a device, the housing bottom bulges out when excessive-pressure exists in the housing, thereby operating the excessive pressure safety protection device which is secured secured to the housing bottom.

It is a known fact that during the operation of power capacitors, especially oil-impregnated capacitors, an explosion-like excessive pressure rise can occur under unfavorable conditions. In this case, the pressure wave which expands within the housing and which causes the deformation of the bottom membrane, is forced to travel in the direction toward the bottom membrane, through the insulating extension piece of the insulating plate which is disposed in a central core tube.

Experience has shown that when an explosion-like pressure rise occurs, the effective cross section is obviously too small to prevent the housing of the capacitor from bulging outwardly in an undesirable way.

It is accordingly an object of the invention to provide an electric capacitor with an excessive-pressure safety protection mechanism, which overcomes the hereinafore-mentioned disadvantages of the heretofore-known devices of this general type, and in which the above-mentioned difficulties are circumvented during an explosion-like pressure build-up in the interior of the capacitor housing.

With the foregoing and other objects in view there is provided, in accordance with the invention, an electric capacitor, comprising a housing having an inwardly-arched, substantially spherical, dome-shaped bottom membrane, a capacitor winding disposed in the housing, an excessive-pressure protection safety device disposed in the housing in vicinity of the bottom membrane, a central core tube disposed in the winding, and an insulating disc disposed between the winding and the bottom membrane, the disc having at least two parts and including an extension protruding into the central core tube.

In accordance with another feature of the invention, the insulating disc has a surface facing the winding, and the surface has corrugations formed thereon. In this way, additional control and guidance of the pressure wave is obtained.

In accordance with a further feature of the invention, the insulating disc has raised projections disposed at the bottom thereof for contacting the bottom membrane.

In accordance with a concomitant feature of the invention, one of the parts of the insulating disc includes the extension and a portion integral with and substantially perpendicular to the extension, and the other of the parts is substantially parallel to the portion and is disposed between the portion and the winding.

Other features which are considered as characteristic for the invention are set forth in the appended claims.

Although the invention is illustrated and described herein as embodied in an electric capacitor with an excessivepressure safety protection mechanism, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when red in connection with the accompanying drawings, in which:

FIG. 1 diagrammatic front-elevational view, partly broken away, of an electrical capacitor installed in a housing;

FIG. 2 is cross-sectional view of an embodiment of the invention wherein the insulating disc is formed in two parts; and FIG. 3 i similar to FIG. 2 of an embodiment of the invention with an additional insulating disc.

Referring now to the figures of the drawings in detail and first, particularly, to FIG. 1 thereof, there is seen a capacitor winding 1 which is installed in a metallic housing 2. The housing 2 is provided at the lower end thereof with a rigid edge 3. The housing has a bottom 4 which is securely connected to the housing 2 at the rigid edge 3 by sheet metal folding. A safety device 5 for protection against excessive pressure is disposed in the center of the housing bottom 4. This housing bottom 4 is constructed in the form of a stable or sturdy spherical dome having an arch which is directed toward the interior of the housing 2.

The capacitor winding 1 is separated from the housing bottom 4 by an insulating disc 6. The insulating disc may be formed of two parts, i.e. a part 7 which projects into a center tube 9 disposed in the capacitor winding, and an annular disc 9. An additional insulating disc 6 can be disposed at the upper end of the capacitor winding.

FIG. 2 shows an enlarged fragmentary, sectional view of the capacitor housing 2 in vicinity of the housing bottom 4. For comparison purposes, the right half of FIG. 2 shows a one-piece insulation disc 10 used in the prior art, while in contrast thereto, the left half of the figure shows the bipartite insulating disc 6, according to the invention. The direction of pressure, as it builds up in the interior of the housing leading to an explosion, is indicated by arrows A. It can be seen that in the case of a conventional insulating disc (shown at the right side of FIG. 2), the pressure is applied directly onto the functional membrane or bottom 4 through the interior of an extension piece 11. In contrast, the left side of FIG. 2 shows that the construction of the insulating disc 6 according to the invention permits the applied pressure to cause the annular ring-shaped part 9 to be separated from the part of the disc 6 which is integral with the extension piece 7, in the direction of the arrows B. On one hand, this causes the whole part of the insulation disc which is connected to or integral with part 7 to be pressed against the housing bottom 4, and on the other hand, an additional pressure compensation or equalization can take place between the parts 7 and 9 in the direction of the housing bottom 4.

For the conduction of the pressure wave, it is of advantage if corrugations are provided on the surface of the insulation disc 7 which faces toward the windings.

As an example, the extension piece 7 which is attached to the insulating disc has a diameter of 33 mm, and the inner diameter of the membrane 4 is 170 mm. Thus, the ratio of the cross-sectional area of the tube to the cross-sectional area of the membrane is 855 mm² to 22,600 mm² or 1:26. Consequently, the spreading of the pressure wave through the central hole onto the bottom or cover region of the housing, is slowed down and braked, and the response time of the break off protection is increased.

In the insulating disc 6 according to the invention, the division between the annular ring-shaped section 9 and the tubular extension piece 7 can be chosen, for example, in such a way that the effective diameter of the extension piece 7 is 75 mm. In this way, the area of the flow cross section is increased to about 4420 mm², and the crosssectional area ratio is improved to about 1:5.

If the divided insulating disc is also used at the upper end of the winding package, the pressure wave can additionally act on the upper insulating disc during an explosion, and break the protective mechanism faster. The effective area of the flow cross section is again doubled as well, i.e. it is increased from 4420 to 8840 mm², corresponding to an improvement of the cross-sectional area ratio to about 1:2.5. In this case, the protective mechanism is clamped between two movable insulating discs, so that the discs act as buffer plates for the pressure wave. Support rings 12 can be provided at the bottom of the capacitor housing 2 to brace and support the insulating disc 6.

The insulating disc according to the invention increases the safety of the capacitor against destruction of the capacitor housing, and the oil contamination caused thereby.

FIG. 3 shows another embodiment with an insulating disc 13. The insulating disc 13 is formed of a tubular extension piece 14 which is disposed in the central core tube 8 of the capacitor winding 1, and an additional insulating member 15 which can be constructed in the form of one integral part or several parts. The insulating member 15 is formed of parts 16, 18, as shown by a dot-dash line. The part 16 serves the particular purpose of insulating a Schoop layer 17 from the capacitor housing, and can be extended at the sides for centering the winding 1. The spacer part 18 permits the extension piece 14 to be lifted. Corrugations 19 are provided on the surface of the extension piece 14 which faces toward the winding; the corrugations provide additional control of the pressure wave. The bottom of the extension piece 14 has raised projections 20 which mechanically transfer a position change of the extension piece 14 to the functional membrane 4 without delay, in direction of an arrow 20'. This is done so that break off or excessivepressure protective safety means 21 can respond at a predetermined breaking point 22.

The foregoing is a description corresponding in substance to German Application No. P 33 25 343.9, dated July 13, 1983, the International priority of which is being claimed for the instant application, and which is hereby made part of this application. Any material discrepancies between the foregoing specification and the aforementioned corresponding German application are to be resolved in favor of the latter.

We claim:

1. Electric capacitor comprising a housing having an inwardly-arched, substantially spherical, dome-shaped bottom membrane, a capacitor winding disposed in said housing, an exmembrane, a capacitor winding disposed in said housing, an execessive-pressure protection safety device disposed in said housing in vicinity of said bottom membrane, a central core tube disposed in said winding, and an insulating disc disposed between said winding and said bottom membrane, said insulating disc having at least two parts, said insulating disc including an extension protruding into said central core tube and said insulating disc having a surface facing said winding, said surface having corrugations formed thereon.

2. Electric capacitor, comprising a housing having an inwardly-arched, substantially spherical, dome-shaped bottom membrane, a capacitor winding disposed in said housing, an excessive-pressure protection safety device disposed in said housing in vicinity of said bottom membrane, a central core tube disposed in said winding, and an insulating disc disposed between said winding and said bottom membrane, said insulating disc having at elast two parts, said insulating disc including an extension protruding into said central core tube and said insulating disc having raised projections disposed at the bottom thereof for contacting said bottom membrane.

3. Electric capacitor, comprising a housing having an inwardly-arched, substantially spherical, dome-shaped bottom membrane, a capacitor winding disposed in said housing, an excessive-pressure protection safety device disposed in said housing in vicinity of said bottom membrane, a central core tube disposed in said winding, and an insulating disc disposed between said winding and said bottom membrane, said disc having at least two parts and including an extension protruding into said central core tube, one of said parts of said insulating disc including said extension and a portion integral with and substantially perpendicular to said extension, and the other of said parts being substantially parallel to said portion and being disposed between said portion and said winding.

* * * * *